United States Patent
Nakayama et al.

[15] 3,650,898

[45] Mar. 21, 1972

[54] PROCESS FOR PRODUCING NICOTINIC ACID MONONUCLEOTIDE

[72] Inventors: Kiyoshi Nakayama, Sagamihara-shi; Haruo Tanaka, Machida-shi, both of Japan

[73] Assignee: Kyowa Hakko Kogyo, Ltd., Tokyo, Japan

[22] Filed: Mar. 25, 1969

[21] Appl. No.: 810,349

[30] Foreign Application Priority Data

Mar. 29, 1968 Japan.....................................43/20057

[52] U.S. Cl. ..........................................................195/28 N
[51] Int. Cl. .........................................................C12d 13/06
[58] Field of Search ................................................195/28 N

[56] References Cited

UNITED STATES PATENTS 3,368,947  2/1968  Nakayama et al. ...................195/28 N Primary Examiner—Alvin E. Tanenholtz
Attorney—Craig, Antonelli and Hill

[57] ABSTRACT

Nicotinic acid mononucleotide is produced in significant amounts by fermentation by a process which comprises culturing a suitable microorganism belonging to the genus Brevibacterium, Corynebacterium, Arthrobacter or Micrococcus under aerobic conditions in an aqueous nutrient medium containing nicotinic acid or nicotinamide. Yields of greater than 2 mg./ml. are obtained in some cases.

14 Claims, No Drawings

PROCESS FOR PRODUCING NICOTINIC ACID MONONUCLEOTIDE

This invention relates to a process for producing nicotinic acid mononucleotide. More particularly, it relates to a process for the production of nicotinic acid mononucleotide by fermentation. Even more particularly, the invention relates to a process for producing nicotinic acid mononucleotide by fermentation with micro-organisms in a nutrient medium containing nicotinic acid or nicotinamide.

Nicotinic acid mononucleotide has the following structural formula:

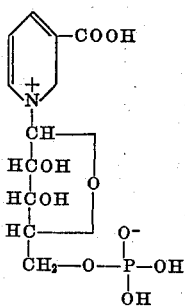

This compound is useful as a biochemical reagent, as a starting material for the manufacture of nicotinamide adenine dinucleotide and the like. Accordingly, processes for its production have been sought in the art.

Among the prior art processes for the preparation of nicotinic acid mononucleotide, there have been reported the production thereof by an enzymatic reaction [*Journal of Biological Chemistry*, Vol. 236, p. 525 (1961)] and its isolation from yeasts [*Archives of Biochemistry and Biophysics*, Vol. 82, p. 83 (1959)] and from *Penicillium chrysogenum* [*Nature*, Vol. 180, p. 1203 (1957)]. However, none of these processes is satisfactory for the industrial production of nicotinic acid mononucleotide.

Accordingly, one of the objects of the present invention is to provide an improved process for the production of nicotinic acid mononucleotide which overcomes the disadvantages and deficiencies of the prior art methods.

Another object of the present invention is to provide a process for producing nicotinic acid mononucleotide which may be carried out in an efficacious and relatively simple manner.

A further object of the invention is to provide a process for producing nicotinic acid mononucleotide by fermentation which may be carried out advantageously on an industrial scale at low cost to give a high yield of product.

A still further object of the invention is to provide nicotinic acid mononucleotide.

These and other objects and advantages of the present invention will become apparent to those skilled in the art from a consideration of the following specification and claims.

As the result of various investigations on a process for producing nicotinic acid mononucleotide by the use of microorganisms, the present inventors have found, in accordance with the present invention, that significant amounts of nicotinic acid mononucleotide are produced and accumulated in the resultant culture liquor if fermentation is carried out in an aqueous nutrient medium to which is added nicotinic acid or nicotinamide. This finding has previously not been reported in the art.

As mentioned above, the detection or isolation of nicotinic acid mononucleotide by means of the prior art processes is difficult from an industrial point of view because of the high costs of the starting materials, the low yields obtained, etc., however interesting their academic values may be. In comparison therewith, the present invention is an extremely practical process and one that makes it possible to produce nicotinic acid mononucleotide effortlessly in high yield at low cost.

The characterizing features of this invention are, as noted above, to add nicotinic acid or nicotinamide to the fermentation medium and to use bacteria belonging to a genus selected from the group consisting of Brevibacterium, Corynebacterium, Arthrobacter and Micrococcus as the micro-organism.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch, starch hydrolysate, molasses, mannose, glycerol, etc., or any other suitable carbon source such as organic acids, for example, acetic acid, lactic acid, pyruvic acid, etc. These substances may be used either singly or in mixtures of two or more.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, ammonium carbonate, etc., or natural substances containing nitrogen, such as cornsteep liquor, yeast extract, meat extract, peptone, fish meal, bouillon, casein hydrolysates (like NZ-Amine), casamino acid, fish soubles, rice bran extract, defatted soybean cake, chrysalis hydrolysate, or various digestion substances thereof, etc., may be employed. Again, these substances may be used either singly or in combinations of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

If strains having specific nutritional growth requirements are employed, the substances needed to satisfy these requirements should, of course, be added to the culture medium. These include substances such as amino acids, vitamins such as thiamine, cobalamin, etc., or biotin.

In accordance with this invention, nicotinic acid or nicotinamide is added to the nutrient medium at the initiation of or during the source of fermentation, all at one time or intermittently. The nicotinic acid and nicotinamide can be added to the medium in the form of nontoxic salts thereof such as the sodium salts, potassium salts, sulfates, hydrochlorides, ascorbate, etc. It is to be understood that such equivalent additives fall within the scope of the present invention. The amount of additive to be used can be varied in accordance with the particular microorganism employed and the culturing conditions used. Generally, an amount of from 0.1 mg./ml. to 100 mg./ml., preferably 1 mg./ml. to 20 mg./ml., of additive nicotinic acid or nicotinamide is employed.

Culturing is conducted under aerobic conditions, such as aerobic shaking of the culture or with aeration and agitation of a submerged culture, at a temperature of, for example, about 20° to 40° C. and at a pH of, for example, about 4.0 to 9.5. After about 2 to 8 days of culturing under these conditions, significant amounts of nicotinic acid mononucleotide are produced and accumulated in the resultant culture liquor.

After the completion of culturing, the nicotinic acid mononucleotide is recovered from the fermentation liquor by conventional means, such as ion exchange resin treatment, extraction with solvents, precipitation, adsorption, chromatography, concentration or the like.

The following examples are given merely as illustrative of the present invention and are not to be considered as limiting. Unless otherwise noted, the percentages therein and throughout the application are by weight per liter of water. Exemplary microorganism strains advantageously employed in the present invention are described therein.

EXAMPLE 1

*Brevibacterium ammoniagenes* ATCC 6872 is used as the seed microorganism. This strain is cultured in a seed medium containing 2 percent glucose, 1 percent peptone, 1 percent yeast extract, 0.3 percent NaCl, and 30 µg./l. of biotin at 30° C. for 24 hours. The resultant seed culture is inoculated in the ratio of 10 percent (by volume) into a fermentation medium having the following composition:

| | |
|---|---|
| 100 g. | glucose |
| 6 g. | urea |
| 10 g. | $KH_2PO_4$ |
| 10 g. | $K_2HPO_4$ |
| 10 g. | $MgSO_4 \cdot 7H_2O$ |
| 0.1 g. | $CaCl_2 \cdot 2H_2O$ |
| 30 µg. | biotin |
| 10 g. | yeast extract |

In preparing the fermentation medium, the above components are dissolved in 1 liter of water, and the pH thereof is adjusted to 8.0 with NaOH. Then, the fermentation medium is poured into individual flasks and is sterilized in an autoclave at a pressure of 1 kg./cm.$^2$ for 10 minutes.

After inoculation, 20 ml. portions of the mixture of seed and fermentation media are poured into 250 ml. conical flasks, respectively. Culturing is then carried out with aerobic shaking at 30° C.

After 72 hours of culturing, nicotinic acid amide is added to the fermentation liquor in an amount so as to give a concentration therein of 2 mg./ml. Culturing is then further continued for 24 hours. As a result, 2.3 mg./ml. of nicotinic acid mononucleotide is produced and accumulated in the fermentation liquor.

The nicotinic acid mononucleotide is adsorbed on a polystyrene strongly basic anion exchange resin [Dowex No. 1 (formic acid type)] and is then eluted with an aqueous solution of ammonium formate.

EXAMPLE 2

Culturing is conducted in the same manner as described in Example 1, except that nicotinic acid is used as the additive to the medium instead of nicotinamide. The amount of nicotinic acid mononucleotide produced in the resultant culture liquor is 2.3 mg./ml.

EXAMPLE 3

Culturing is conducted in the same manner as described in Example 1, except that *Corynebacterium sp.* ATCC 21084 is used as the seed microorganism instead of *Brevibacterium ammoniagenes*. The amount of nicotinic acid mononucleotide produced in the cultured liquor is 1.7 mg./ml.

EXAMPLE 4

Culturing is conducted in the same manner as described in Example 1, except that *Arthrobacter sp.* ATCC 21085 is used as the seed microorganism instead of *Brevibacterium ammoniagenes*. The amount of nicotinic acid mononucleotide produced in the cultured liquor is 1.3 mg./ml.

EXAMPLE 5

*Micrococcus sodonensis* ATCC 15932 is used as the seed microorganism. Culturing is conducted in the same manner and under the same conditions as described in Example 1. As a result, the amount of nicotinic acid mononucleotide produced and accumulated in the fermentation liquor is 0.4 mg./ml.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing nicotinic acid mononucleotide which comprises culturing a nicotinic acid mononucleotide-producing microorganism belonging to a genus selected from the group consisting of Brevibacterium, Corynebacterium, Arthrobacter and Micrococcus under aerobic conditions in an aqueous nutrient medium containing nicotinic acid or nicotinamide, accumulating nicotinic acid mononucleotide in the resultant culture liquor, and recovering and isolating said nicotinic acid monocucleotide therefrom.

2. The process of claim 1, wherein said microorganism is *Brevibacterium ammoniagenes*.

3. The process of claim 1, wherein said microorganism is *Micrococcus sodonensis*.

4. The process of claim 1, wherein the nicotinic acid or nicotinamide is added to the medium at the initiation of culturing.

5. The process of claim 1, wherein the nicotinic acid or nicotinamide is added to the medium after the initiation of culturing.

6. The process of claim 1, wherein the nicotinic acid or nicotinamide is added to the medium in the form of a sodium salt, potassium salt, sulfate or hydrochloride thereof.

7. The process of claim 1, wherein about 1 mg./ml. to 20 mg./ml. of nicotinic acid is added to the medium.

8. The process of claim 1, wherein about 1 mg./ml. to 20 mg./ml. of nicotinamide is added to the medium.

9. A process for producing nicotinic acid mononucleotide which comprises culturing a nicotinic acid mononucleotide-producing microorganism belonging to a genus selected from the group consisting of Brevibacterium, Corynebacterium, Arthrobacter and Micrococcus at a temperature of about 20° to 40° C. and at a pH of about 4.0 to 9.5 under aerobic conditions in an aqueous nutrient medium containing nicotinic acid or nicotinamide, accumulating nicotinic acid mononucleotide in the resultant culture liquor, and recovering and isolating said nicotinic acid mononucleotide therefrom.

10. The process of claim 9, wherein about 1 mg./ml. to 20 mg./ml. of nicotinic acid or nicotinamide is added to the medium.

11. The process of claim 10, wherein said microorganism is *Brevibacterium ammoniagenes* ATCC 6872.

12. The process of claim 10, wherein said microorganism is *Corynebacterium sp.* ATCC 21084.

13. The process of claim 10, wherein said microorganism is *Arthrobacter sp.* ATCC 21085.

14. The process of claim 10, wherein said microorganism is *Micrococcus sodonensis* ATCC 15932.

* * * * *

UNITED STATES PATENT OFFICE
CERTIFICATE OF CORRECTION

Patent No. 3,650,898     Dated March 21, 1972

Inventor(s) Kiyoshi NAKAYAMA and Haruo TANAKA

It is certified that error appears in the above-identified patent and that said Letters Patent are hereby corrected as shown below:

On the Title Page, left-hand column, line 5 "Assignee: Kyowa Hakko Kogyo, Ltd., Tokyo, Japan" should read:

--Assignee: Kyowa Hakko Kogyo Co., Ltd., Tokyo, Japan--

Signed and sealed this 3rd day of October 1972.

(SEAL)
Attest:

EDWARD M. FLETCHER, JR.
Attesting Officer

ROBERT GOTTSCHALK
Commissioner of Patents